United States Patent [19]

Jones et al.

[11] Patent Number: 4,904,913
[45] Date of Patent: Feb. 27, 1990

[54] MOTOR CONTROL SYSTEM FOR A PLASTIC FORMING MACHINE

[75] Inventors: M. Donald Jones, Bullard; David W. Kennedy, Frankston, both of Tex.

[73] Assignee: Power Saving Devices, Inc., Houston, Tex.

[21] Appl. No.: 220,270

[22] Filed: Jul. 18, 1988

[51] Int. Cl.⁴ .................. G05B 19/24; B29C 45/77
[52] U.S. Cl. .................... 318/560; 318/571; 318/568.1; 425/149; 425/150; 364/473; 364/476
[58] Field of Search ............ 318/362, 560-574, 318/332; 364/476; 425/144-149, 150, 152, 153, 565, 575, 590, 589, 170, 155-159, 140

[56] References Cited

U.S. PATENT DOCUMENTS

| | | | |
|---|---|---|---|
| 3,597,794 | 8/1971 | Mann | 425/145 X |
| 3,752,363 | 8/1973 | Fegley et al. | 425/149 X |
| 3,767,339 | 10/1973 | Hunkar | 425/154 |
| 3,860,801 | 1/1975 | Hunkar | 364/476 |
| 3,932,083 | 1/1976 | Boettner | 425/145 |
| 3,939,329 | 2/1976 | Doran | 364/476 X |
| 4,008,829 | 2/1977 | Chandra et al. | 318/571 X |
| 4,011,493 | 3/1977 | Fukase et al. | 318/568 |
| 4,060,362 | 11/1977 | Wilson | 425/145 |
| 4,437,046 | 3/1984 | Faillace | 364/476 X |
| 4,473,215 | 9/1984 | Rathfon, II et al. | 425/149 X |
| 4,695,237 | 9/1987 | Inaba | 364/473 X |
| 4,718,841 | 1/1988 | Kiya | 425/149 |
| 4,721,893 | 1/1988 | Rehmann et al. | 318/332 |
| 4,759,705 | 7/1988 | Otake et al. | 425/145 |
| 4,774,675 | 9/1988 | Kagawa | 425/150 X |
| 4,785,221 | 11/1988 | Neko | 318/362 X |
| 4,802,834 | 2/1989 | Neko | 425/150 X |
| 4,805,112 | 2/1989 | Neko | 364/476 |
| 4,816,196 | 3/1989 | Otake | 425/149 X |

Primary Examiner—William M. Shoop, Jr.
Assistant Examiner—Paul Ip
Attorney, Agent, or Firm—Dodge, Bush & Moseley

[57] ABSTRACT

A motor control system for a plastic forming machine such as an injection molding machine is disclosed including an interface circuit and a phase inverter for sensing the individual operation steps of the molding machine, producing a time stream of voltage levels, each of which are representative of the least amount of power required by the molding machine to perform machine functions during such operation steps, and for varying the speed of the motor in response to such voltage levels during each of such operation steps so as to reduce the amount of electrical power required by such machine during its cycle period.

3 Claims, 3 Drawing Sheets

FIG. 4 SEQUENCE OF OPERATIONS

MOTOR CONTROL SYSTEM FOR A PLASTIC FORMING MACHINE

BACKGROUND OF THE INVENTION

1. Field of the Invention

This invention relates to a system for minimizing the operating power required by a molding machine, such as an injection molding machine or a die casting machine, which has a constant speed electric motor supplied by alternating current power for driving hydraulic pumps for control of various operation functions of the machine. In particular, the system minimizes power applied to the motor during each of the various operating steps of a cycle of operation, for example of an injection molding machine, where such operation steps include one or more functions of the machine such as mold open, mold closed, inject, screw rotate, boost, and minimum speed.

2. Description of the Prior Art

Injection molding machines and die casting machines are typically hydraulically driven. Such machines will be referred to hereafter collectively as "plastic forming machines". An alternating current motor is provided with the machine to drive hydraulic pumps in order to provide pressurized hydraulic fluid to hydraulic cylinders for driving pistons which serve to perform various functions of the machine such as opening as mold, closing the mold, injecting plastic in the mold, rotating a screw during the mold closed function, providing boost hydraulic fluid during the injection function, and so on.

Most machines in commercial operation are provided with constant speed motors to drive, fixed volume hydraulic pumps. Such motors and pumps are sized to operate at the maximum capacity of the machine, yet for many articles made in the machine, maximum power of the machine is not required. Where the fixed volume pump produces more pressurized hydraulic fluid than required, excess fluid is returned via relief valves to the fluid supply, but power during each operating step of the machine and total energy is wasted by the motor operating at constant speed. Consequently, countless plastic molding and casting machines are in commercial operation which use more electric power for their operation than is required.

Identification of Objects of the Invention

It is an object of the invention, in view of the wasted power being consumed by plastic molding and casting machines which are powered by fixed speed motors, to provide a system to match the speed of the motor and consequently its power consumption to the required power of the machine during each of its operation steps, so as to reduce the electric power required to operate the machine.

It is another object of the invention to provide a system for fixed-speed motor drive plastic molding and casting machines with a fixed volume pump which corrects the electrical power factor of the motor thereby providing more efficient operation at any speed of the motor.

Another object of the invention is to provide a system for such a machine such that soft motor starts are achieved.

Still another object of the invention is to provide a system for such a machine which allows its motor and fixed volume pumps to be operated more efficiently such that less excess heat is generated with consequent less need for cooling water for the hydraulic components of the machine.

SUMMARY

The objects identified above, as well as other advantages and features which will be apparent from the detailed description of the invention below, results from a system including an interface circuit and a phase inverter which are connected to a plastic forming machine. The machine to which the system is connected includes an a.c. motor for powering one or more hydraulic pumps for supplying pressurized hydraulic fluid to the machine during operation functions of the machine. Such functions for an injection molding machine include mold open, mold closed, inject plastic, screw rotate, boost, and minimum speed, which are accomplished by hydraulic cylinder/piston components and indicated by the presence of electrical signals in a control panel of the machine at electrical signal points corresponding to such functions.

At least one of the operation functions and corresponding electrical signals at such signal points is present during each cycle of operation steps of the machine. For example, in one step, only a mold closed signal is present at the control panel signal points. In another step, only a mold closed signal, an inject signal and a boost signal are present. In still another operating step, only the mold closed signal and the inject signal are present. Each operating step of the machine is characterized by a unique combination of control signals being present.

The interface circuit of the invention is connected to the control panel electrical signal points by a plurality of leads corresponding to the number of such signal points. The interface circuit includes an output lead, a voltage source and a logic circuit which is connected to the voltage source and to the output lead. The logic circuit produces a logic control signal comprising a time stream of voltage level steps which correspond in time to the operation steps of the plastic forming machine. The voltage level of each step is representative of the power needed by the motor to provide approximately the least amount of power necessary to power the hydraulic pump or pumps of the machine for each of the operation steps.

The phase inverter of the system is supplied by line frequency alternating current power and responds to the logic control signal from the output lead of the interface circuit. The inverter applies output alternating current power of variable frequency to the motor of the plastic forming machine such that the frequency of such output power is approximately directly proportional, during the time period of each operation step of the plastic forming machine, to the voltage level of the logic control signal.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown of which.

DESCRIPTION OF THE INVENTION

Figure 1:
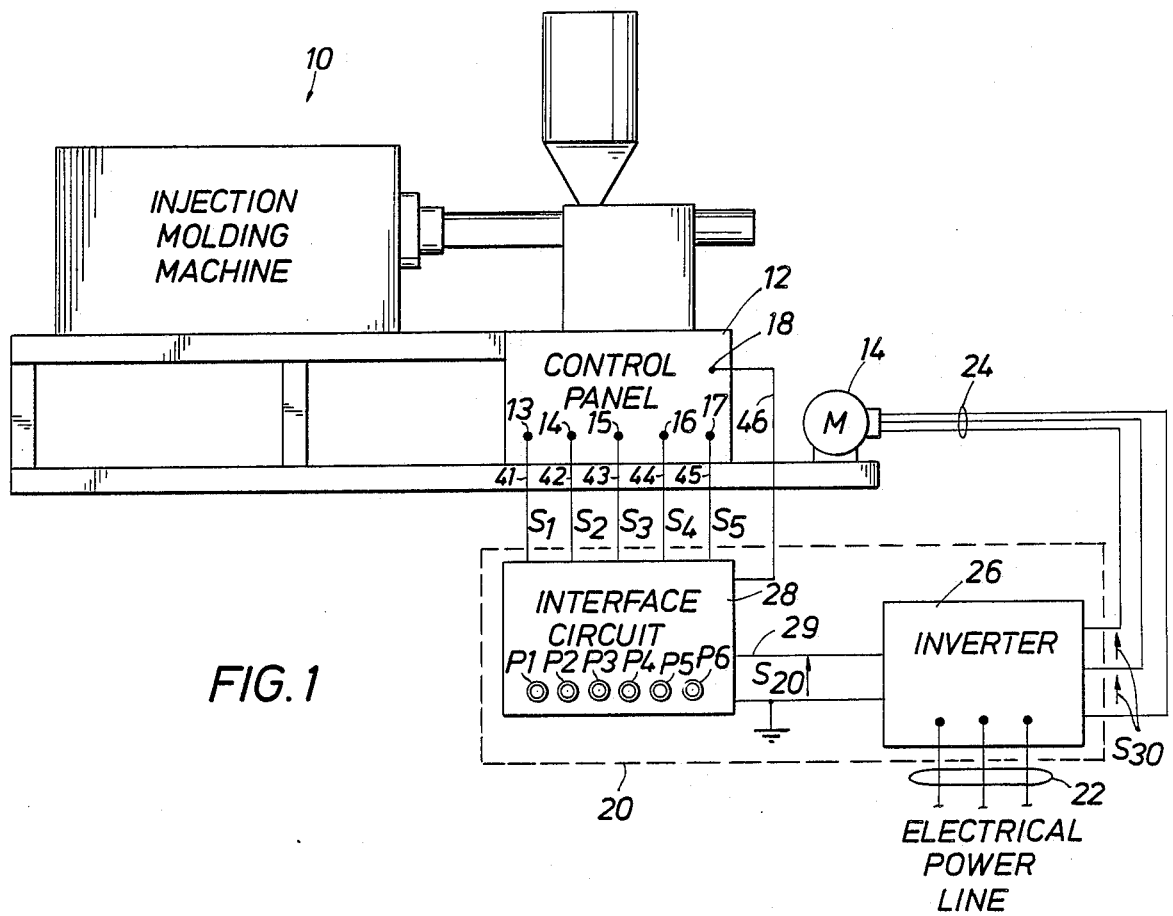
FIG. 1 is a block diagram of a plastic forming machine such as an injection molding machine having an alternating current motor and including a motor control system comprising an interface circuit and an inverter.

FIG. 1 shows a plastic forming machine, particularly an injection molding machine, to which a motor control system 20 according to the invention is attached. Rather than the motor 14 of the machine 10 being directly powered from electrical power line 22, which is typically three phase power from the motor starter of machine 10, the motor is powered via three phase lines 24, the frequency of which is varied by inverter 26 in accordance with the power needs of the machine during its operation steps as determined by interface circuit 28. Interface circuit 28 is connected to control panel 12 of the machine 10 so as to detect a number of operation "functions" of the machine 10. For illustrative purposes, for a plastic forming machine such as an injection molding machine, such operation functions are mold open, mold closed, inject, screw rotate, boost and power on (minimum speed). Similar functions, though not identical, would be present in a die casting machine.

The functions identified above for an injection molding machine are indicated by the presence of electrical signals in control panel 12 of machine 10. Such signals appear at electrical terminals 13–18 which correspond to the operation functions identified above. For machines not provided with the motor control system 20 of the invention, and which have a constant speed motor 14 and fixed volume hydraulic pumps, the motor is driven at constant speed regardless of which operation function and operation step the machine is performing. Certain operation steps require more pressurized hydraulic fluid than others, and depending on the product being molded (or cast) by the machine, excessive power is used by motor 14 for such steps with the result that excess hydraulic fluid not needed for the step is returned to the hydraulic fluid supply. Pumping excess fluid not only is wasteful of energy consumed by the machine 10, it also requires the pumps to be operated at maximum capacity resulting in excess heat generation, which if great enough, may require water cooling to prevent overheating of components of the machine.

The interface circuit 28 of the motor control system 20 in combination with the inverter 26 acts to substantially match the power supplied from power line 22 to the power needs of machine 10 for any operation step of machine 10 for a particular product being fabricated by machine 10. Such matching is accomplished by operator control of potentiometers $P_1$–$P_6$ of the interface circuit during set up of the machine for the particular machine. A description of the procedure for setting of the potentiometers is provided below after description of the interface circuit 20 and its control of inverter 26.

Figure 2:
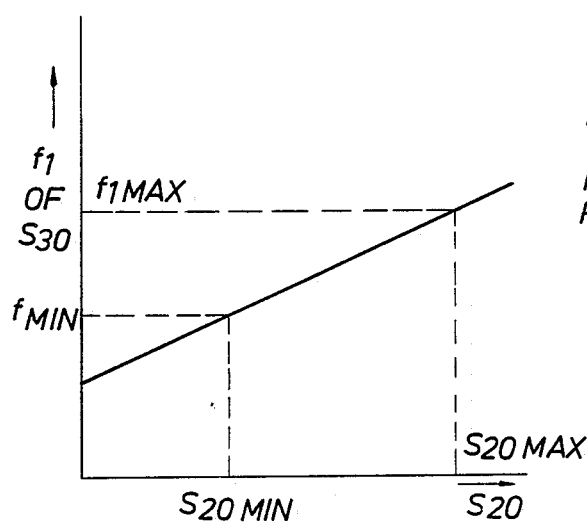
FIG. 2 is a graphical representation of the relationship between the voltage level of the control signal applied to the inverter and the frequency of the output power of the inverter which is applied to the alternating current motor of the injection molding machine.
Figure 3:
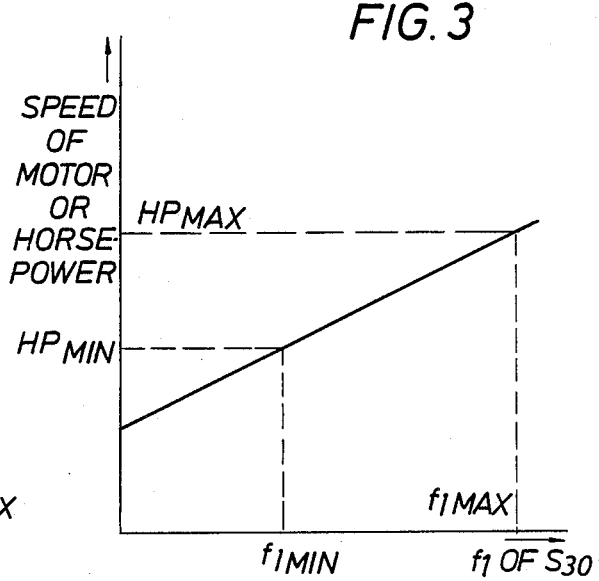
FIG. 3 is a graphical representation of the relationship between the frequency of the output power applied to the alternating current motor of an injection molding machine and its speed or its horsepower used in driving one or more hydraulic pumps of the machine.

FIGS. 2 and 3 illustrate the functional relationships between the d.c. level of the output signal $S_{20}$ of interface circuit 28 and the speed or horsepower of motor 14 caused by inverter 26 varying the speed and consequently its power consumed. Speed control of motor 14 is accomplished by varying the frequency of the a.c. power $S_{30}$ from inverter 26 on a.c. leads 24 applied to motor 14. As illustrated, the d.c. level of signal $S_{20}$ during each operation step of machine 10 is directly proportional to the frequency $f_1$ of power signal $S_{30}$ output by inverter 26. FIG. 2 shows that inverter 26 responds to d.c. input signal levels of logic control signal $S_{20}$ between an upper level designated $S_{29max}$ and a lower level designated $S_{29min}$ to produce an a.c. power signal $S_{30}$ of frequency between $f_{lmax}$ and $f_{lmin}$. The a.c. motor 14 varies its speed and its power consumed between levels $HP_{max}$ and $HP_{min}$ corresponding to the frequency of power signal $S_{30}$ applied to it between frequency levels $f_{1max}$ and $f_{1min}$. Interface circuit provides d.c. levels of $S_{20}$ for each operation step, for a particular product being fabricated by machine 10, such that the horsepower used for such steps is matched to the power required by the machine to accomplish that operation step.

Figure 4:
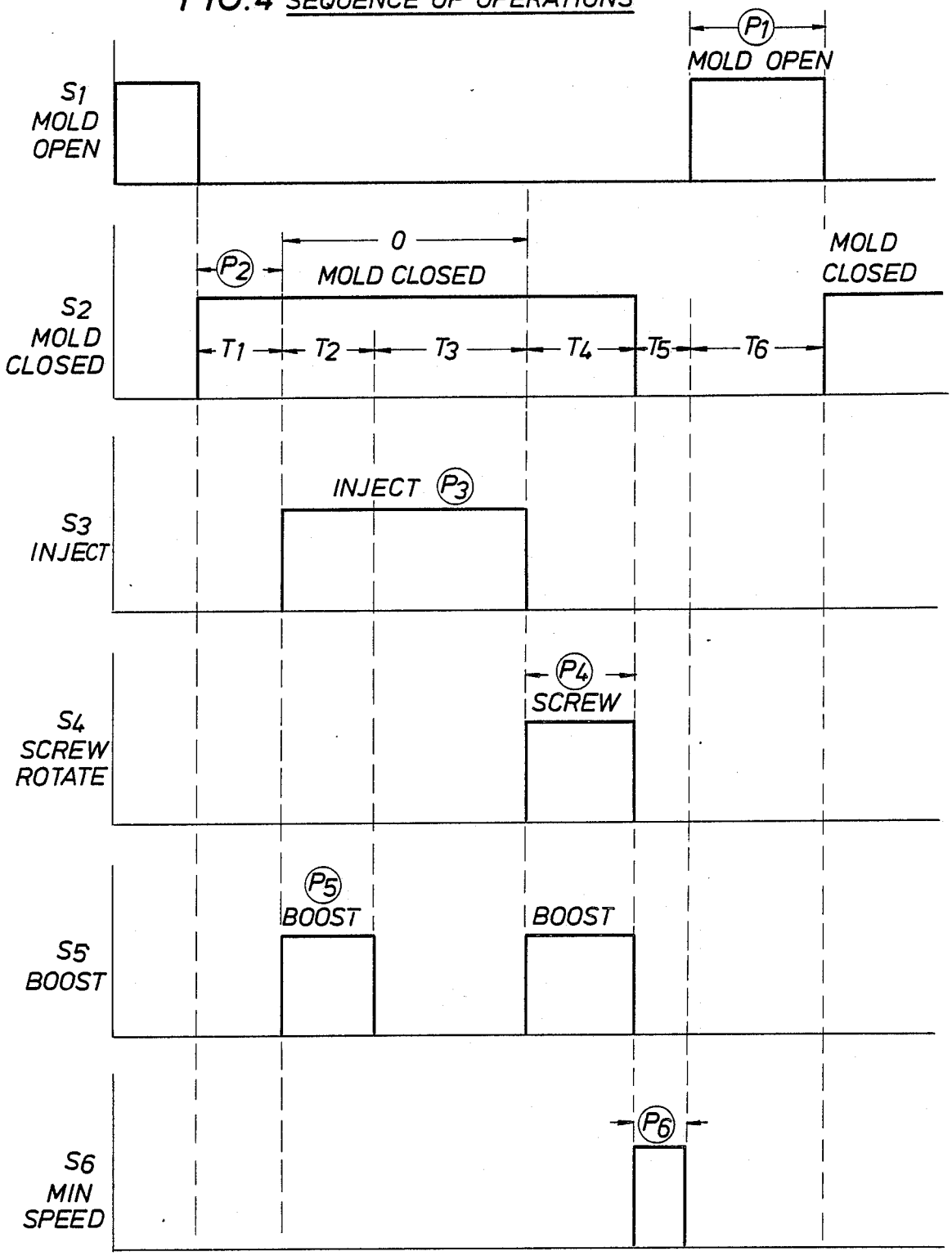
FIG. 4 is a time-line of a complete cycle of operations of an injection molding machine and shows the various operation functions indicated by electrical signals of the control panel of the machine and further shows various operational steps of the machine where one or more of the functions are being performed.

FIG. 4 illustrates the sequence of operation steps and operation functions of an injection molding machine. A similar sequence of operations diagram (with FIG. 4 as a model) could be prepared for a die casting machine by one of skill in the art of plastic forming machines. FIG. 4 indicates that for six operation steps of a cycle of operation for injection molding machine 10, a unique circuit 28 is effective in establishing the d.c. voltage level for a time period corresponding to the operation step period thereby producing a time stream of voltage level steps of signal $S_{20}$ on lead 29 output of circuit 28. For example, FIG. 4 shows that during the time the signal $S_2$ on terminal 13 of control panel 12 of machine 10 is present indicating that the mold of the machine is closed, four different operation steps are sequentially performed. During the time period indicated by time $T_1$, no signal, other than signal $S_2$ is applied to interface circuit 28. FIG. 4 indicates that during $T_1$ or during the first operation step, the potentiometer $P_2$ is effective in establishing the d.c. voltage level of signal $S_{20}$ output from interface circuit to inverter 26. During time $T_2$, when signal $S_2$ (mold closed), $S_3$ (inject) and $S_5$ (boost) are present, the potentiometer $P_5$ is effective in establishing the d.c. voltage level of signal $S_{20}$ output. During the time $T_2$, when signals $S_2$ and $S_3$ are present, the potentiometer $P_3$ of interface circuit 28 is effective in establishing the d.c. voltage level of signal $S_{20}$ output. In like manner potentiometer $P_4$ is effective in establishing the d.c. level of signal $S_{20}$ during operation step of time $T_4$.

The potentiometer $P_6$ is effective in establishing the d.c. level of signal $S_{20}$ during operation step $T_5$ where signal $S_6$ is the only operation function signal present. Potentiometer $P_1$ is effective in establishing the d.c. level of signal $S_{20}$ during the mold open signal or function.

Figure 5:
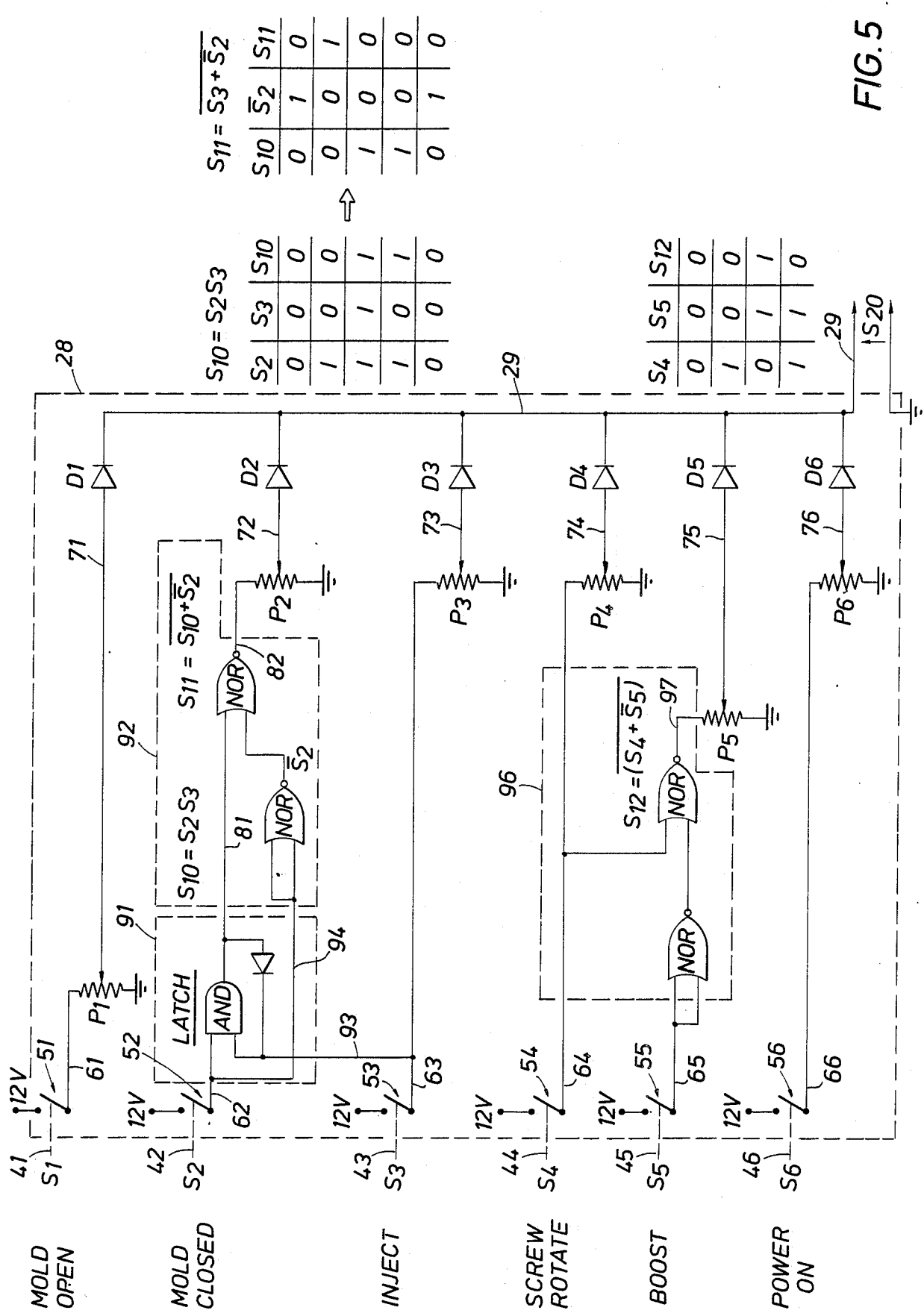
FIG. 5 is a schematic of a logic circuit, (with boolean tables illustrating its operation), in response to signals indicating the presence of operation functions of the molding machine for producing a time stream of voltage levels, corresponding in time with the operational steps of the machine for application to the inverter of the motor control system.

FIG. 5 illustrates the preferred embodiment of interface circuit for generating a time stream of voltage levels each corresponding to one of the operation steps $T_1$–$T_6$ shown in FIG. 4. The leads 41–46 respectively connected to electrical terminals 13–18 of control panel 18 periodically have signals $S_1$–$S_6$ applied to them as illustrated in FIG. 4. Switches 51–56 are closed by signals $S_1$–$S_6$ on leads 41–46 when they are present; when a signal is not applied to one of the leads 41–46, the switch associated with that particular switch remains open. Switches 51–56 are preferably semi-conductor switch assemblies such as LED diode/light sensitive transistors or field effect transistors. Each switch is connected to a source of d.c. potential, preferably a 12 volt supply. The supply voltage is preferably developed by rectifying a source of a.c. voltage from the control panel.

The functioning of interface circuit 28 of FIG. 5 can best be explained by simultaneous reference to FIG. 4. During operation step $T_6$, only one operation function signal $S_1$ (mold open) is applied to interface circuit 28. With the signal present on lead 41, the twelve volt supply is applied to potentiometer $P_1$ and, depending on the setting of its wiper arm, a percentage of the twelve volts, for example three volts, is applied via diode $D_l$ to output lead 28 for application to inverter 26. As a result, for each cycle of molding machine 26 as it is making molded plastic products, during the operation step of $T_6$, such voltage level is applied to inverter 26.

During the operation step identified by time period $T_1$ of FIG. 4, the mold closed signal $S_2$ is present on lead 42 thereby closing switch 52. The inject signal $S_3$ on lead 42 is not present. Thus, the logic condition on lead 62 can be characterized as "high" or a "1" while the logic condition on lead 63 can be characterized as "low" or a "0". Logic circuitry including circuits 91 and 92 - processes combinations of logic conditions appearing on leads 62 and 63. For example, the latch circuit 91 has inputs of $S_2$ and $S_3$ via leads 62 and 63 and products a boolean output $S_{10}$ on lead 81. The boolean output $S_{10}$ on lead 81 and signal $S_2$ on lead 94 are applied to logic circuit 92 producing a boolean output signal $S_{11}$ on lead 82 for application to potentiometer $P_2$ The boolean logic tables in FIG. 5 show that the only time a signal appears on lead 82 (i.e., when boolean signal $S_{11}$ is a "1") is when $S_2$ is a 1 and $S_3$ is a 0. Any other combination of signals on leads 42 and 43 results in the twelve volt supply not being applied to potentiometer $P_2$. Consequently, only if the mold closed signal is present on lead 42 ($S_2=1$) and the inject signal is not present ($S_3=0$) will the potentiometer $P_2$ be effective in applying a percentage of the twelve volt supply to output lead 28. As a result, the setting of the wiper arm 72 of potentiometer $P_2$ applies a percentage of the twelve volt supply via diode $D_2$ during the operation step $T_1$.

During the operation step identified as $T_2$ in FIG. 4, operation functions of mold closed, inject and boost are simultaneously present, that is signals $S_2$, $S_3$ and $S_5$ on leads 42, 43 and 45 are present thereby closing switches 52, 53, and 55. The logic circuit 96 to which "1"'s and "0"'s are applied via leads 64 and 65 is defined by the boolean table for the signal $S_{12}$ appearing on lead 97. In other words, the twelve volt supply is only applied to lead 97 of potentiometer $P_5$ when $S_4$ is a "0" and $S_5$ is a "1". Consequently during the $T_2$ operation step, the twelve volt supply is applied simultaneously to potentiometer $P_3$, by virtue of the closing of switch $S_3$, and to potentiometer $P_5$ The twelve volt supply is not applied to potentiometer $P_2$ by virtue of the fact that signal $S_3$ is a "1" (see the boolean table for $S_{11}$ on lead 82 when $S_2=1$ and $S_3=1$). The setting of potentiometer $P_5$ will be higher than that of potentiometer $P_3$ because more hydraulic fluid is required during the boost phase of the machine 10 than during the inject phase. As a result, the setting of potentiometer $P_5$ defines the voltage level of the time stream of voltage levels during operation step $T_2$.

During the operation step defined by period $T_3$, the setting of potentiometer $P_3$ controls the voltage level on lead 28 of the time stream of voltage levels, because potentiometer $P_2$ is not activated because of the action of logic circuits 91 and 92.

During the operation step defined by period $T_4$ the twelve volt supply is applied simultaneously to potentiometers $P_2$ and $P_4$ in that signals $S_2$, $S_4$ and $S_5$ are present. The voltage is not applied to potentiometer $P_5$ because of logic circuit 96. During operation step $T_4$, the potentiometer $P_4$ controls the voltage level because its wiper arm is set higher due to the increased hydraulic fluid required to be ultimately supplied by motor 14 when the screw function is being performed.

During the operation step defined by period $T_5$ the mold closed signal is removed and the minimum speed signal $S_6$ is applied by control panel 12. Consequently the twelve volt supply is applied to potentiometer $P_6$ via lead 66 and the voltage level applied via diode $D_6$ depends on the setting of the wiper arm of potentiometer $P_6$ during period $T_5$.

The setting of the wiper arms of potentiometers $P_1$–$P_6$ is performed by an operator of the molding machine during the set up of the machine at the time a new product is first made. For example, the operator observes the machine during the $T_1$ operation step and adjusts potentiometer $P_2$ to a minimum level such that the mold closes properly with the motor being driven at a speed, determined by the voltage level output from potentiometer $P_2$, thereby lowering the speed of the motor from full speed (equivalent to a twelve volt input to inverter 26 on lead 29) to the speed corresponding to the lower voltage.

With the potentiometer $P_2$ properly set to close the mold, the next operation step, $T_2$, requires that the boost potentiometer $P_5$ be properly set such that the motor 14 is running at a speed, greater than the speed set by potentiometer $P_2$, to perform the mold closed, inject, and boost operation functions.

With potentiometer $P_5$ set as above, potentiometer $P_3$ is set such that during operation step $T_3$, the voltage level applied to inverter 26 is sufficient to supply just enough hydraulic fluid to perform the mold closed function and the inject function.

With the potentiometer $P_3$ set as above, potentiometer $P_4$ is set such that during operating step $T_4$, the voltage level applied to inverter 26 is sufficient to drive motor 14 at a speed sufficient to supply just enough hydraulic fluid to perform the mold closed function, the screw rotate function and the boost function.

With the mold closed signal removed the wiper arm of the potentiometer $P_6$ is set to a position by the operator such that the motor is controlled by inverter 26 to run at minimum speed. Similarly with the mold open function and signal $S_1$ present, the setting of wiper arm of potentiometer $P_1$ provides a minimum voltage level of signal $S_{20}$ to inverter via lead 29 to supply enough hydraulic fluid to perform the mold open function.

Various modifications and alterations in the described apparatus will be apparent to those skilled in the art from the foregoing description which does not depart from the spirit of the invention. For this reason, these changes are desired to be included in the scope of the appended claims. The appended claims recite the only limitations of the present invention and the descriptive matter which is employed for setting forth the present embodiment and is to be interpreted as illustrative and not limitative.

What is claimed is:

1. A motor control system for a motor which powers one or more hydraulic pumps for supplying pressurized hydraulic fluid to a plastic forming machine during operation functions of the machine, said machine having a plurality of electrical signal points, each signal point corresponding to an individual operation function of the machine such that at least one electrical signal is applied to each signal point when the machine is in an operation function, the machine having operating time intervals during which a least one operation function is present, the control system comprising, input leads individually connected to each of said signal points, an interface circuit including
an output lead,
a voltage source, and
logic circuit means connected to said voltage source and to said input leads for generating on said output lead a logic control signal comprising a time stream of voltage level steps corresponding in time to said operating time intervals of said plastic forming machine, wherein the voltage level of each step is representative of the power needed by said motor to provide approximately the least amount of power necessary to power said hydraulic pump for each of said operating time intervals, and phase inverter means having a line frequency alternating current power source applied to it and responsive to said logic control signal for applying output alternating current power of variable frequency to said motor which powers the one or more hydraulic pumps of said plastic forming machine, said frequency of said output power being approximately directly proportional, during each of said operating intervals of said plastic forming machine, to the voltage level of said logic control signal.

2. The motor control system of claim 1 wherein said logic circuit means of said interface circuit includes, a plurality of potentiometers, the number of potentiometers corresponding to the number of said operation functions of said molding machine, each of said potentiometers having a variable wiper output terminal with each wiper output terminal connected to said output lead via a diode, a plurality of switch means, each of said switch means corresponding to each of said operation functions of said molding machine, each switch means being connected to said voltage source and being individually controllable by one of said input leads for connecting said voltage source to the output terminal of each switch when an electrical signal indicative of an operation function of said machine is present on an individual input lead, and circuit means having a plurality of input leads, each of which is connected to one of said output terminals of said switch means, for connecting said voltage source to one or more of said electrical signals on said input leads, such that a percentage of said voltage source is applied to said output lead depending on the position of said variable wiper of each potentiometer and said operating time interval of said plastic forming machine, wherein said percentage of said voltage source for each of said operating time intervals is a voltage level representative of the power needed by said motor to provide approximately the least amount of power necessary to provide pressurized hydraulic fluid for each of said operating time intervals.

3. The motor control system of claim 1 wherein said signal points correspond to the operation functions of the machine including, mold open,
inject,
screw rotate,
boost, and
minimum speed, and wherein said operating time intervals of the machine include, the time interval where only the mold closed signal is present, the time interval where only the mold closed signal, the inject signal, and the boost signal are present, the time interval where only the mold closed signal, the screw signal, and the boost signal are present, the time interval where only the minimum speed signal is present, and the time interval where only the mold open signal is present, and wherein only one of said plurality of potentiometers is effective in setting said voltage level on said output line during each of said operating time intervals of said machine.

* * * * *

REEXAMINATION CERTIFICATE (2919th)
United States Patent [19]
Jones et al.

[11] B1 4,904,913
[45] Certificate Issued Jun. 18, 1996

[54] MOTOR CONTROL SYSTEM FOR A PLASTIC FORMING MACHINE

[75] Inventors: M. Donald Jones, Bullard; David W. Kennedy, Frankston, both of Tex.

[73] Assignee: Power Saving Devices, Inc., Tex.

Reexamination Request:
No. 90/003,832, May 15, 1995

Reexamination Certificate for:
Patent No.: 4,904,913
Issued: Feb. 27, 1990
Appl. No.: 220,270
Filed: Jul. 18, 1988

[51] Int. Cl.$^6$ .............. G05B 19/24; B29C 45/77
[52] U.S. Cl. .............. 318/560; 318/571; 318/568.1; 425/149; 425/150; 364/473; 364/476
[58] Field of Search .............. 318/560–574, 318/568.1, 362, 332; 364/476; 425/144–153, 565, 575, 590, 589, 170, 155–159, 140

[56] References Cited
PUBLICATIONS

"VT130G1 Transistor Inverter", *Toshiba Instruction and Maintenance Manual*, (Oct. 1985), pp. 1–73.
"Variable Volume Pump System with Standard Controls", Dec. 1994, (Excerpts).
"Processing" IMM Power Use Cut by 70%, Plastics World, Feb. 1986.

*Primary Examiner*—Paul Ip

[57] ABSTRACT

A motor control system for a plastic forming machine such as an injection molding machine is disclosed including an interface circuit and a phase inverter for sensing the individual operation steps of the molding machine, producing a time stream of voltage levels, each of which are representative of the least amount of power required by the molding machine to perform machine functions during such operation steps, and for varying the speed of the motor in response to such voltage levels during each of such operation steps so as to reduce the amount of electrical power required by such machine during its cycle period.

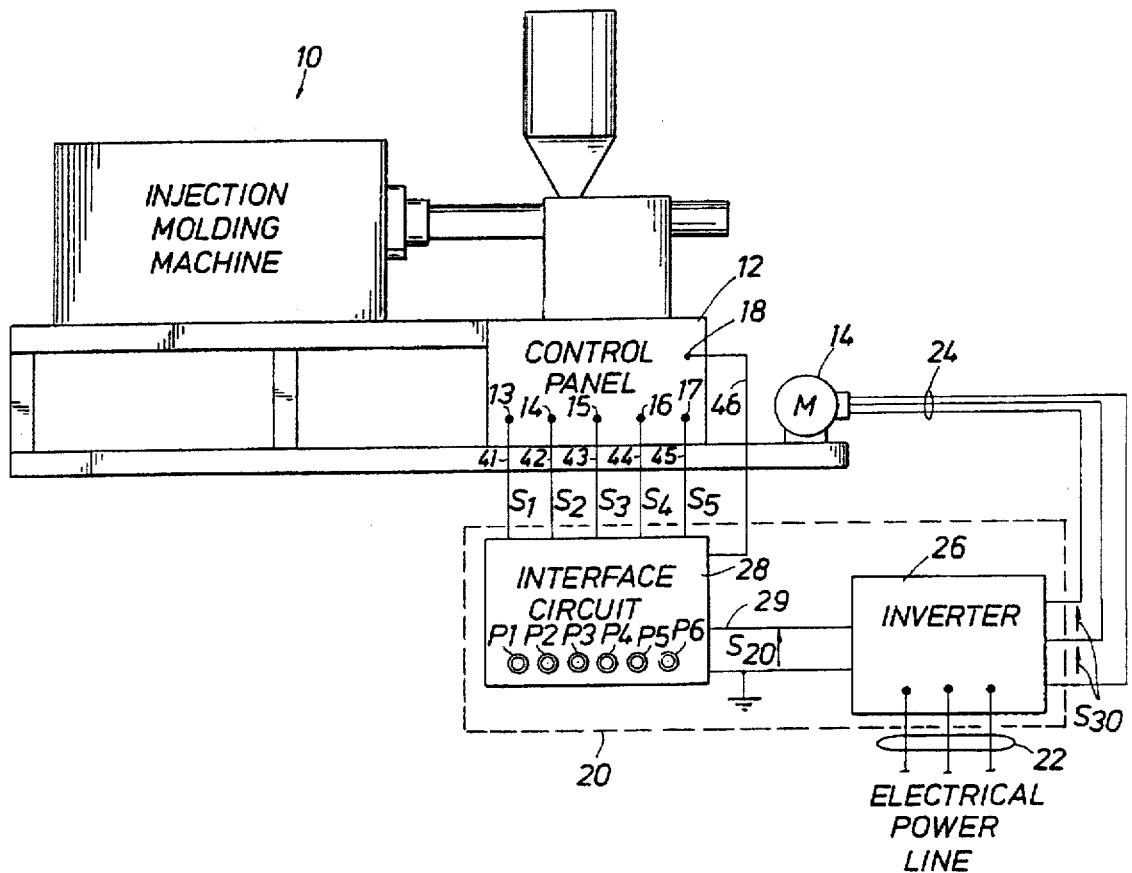

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *

REEXAMINATION CERTIFICATE (3536th)

United States Patent [19]
Jones et al.

[11] B2 4,904,913
[45] Certificate Issued Jun. 9, 1998

[54] MOTOR CONTROL SYSTEM FOR A PLASTIC FORMING MACHINE

[75] Inventors: M. Donald Jones, Bullard; David W. Kennedy, Frankston, both of Tex.

[73] Assignee: Power Saving Devices, Inc., Houston, Tex.

Reexamination Request:
No. 90/004,761, Sep. 26, 1997

Reexamination Certificate for:
Patent No.: 4,904,913
Issued: Feb. 27, 1990
Appl. No.: 220,270
Filed: Jul. 18, 1988

Reexamination Certificate B1 4,904,913 issued Jun. 18, 1996

[51] Int. Cl.⁶ .................... G05B 19/24; B29C 45/77
[52] U.S. Cl. .............. 318/560; 318/571; 318/568.1; 425/149; 425/150; 364/473; 364/476
[58] Field of Search ............ 60/368, 390, 486; 264/40.7, 328.12, 328.13; 425/150, 145, 149; 91/35; 318/560, 571, 568.1; 364/473, 476

[56] References Cited

U.S. PATENT DOCUMENTS

| | | |
|---|---|---|
| 3,422,648 | 1/1969 | Lemelson . |
| 3,911,677 | 10/1975 | Collins . |
| 4,120,922 | 10/1978 | Lemelson . |

*Primary Examiner*—Paul Ip

[57] ABSTRACT

A motor control system for a plastic forming machine such as an injection molding machine is disclosed including an interface circit and a phase inverter for sensing the individual operation steps of the molding machine, producing a time stream of voltage levels, each of which are representative of the least amount of power required by the molding machine to perform machine functions during such operation steps, and for varying the speed of the motor in response to such voltage levels during each of such operation steps so as to reduce the amount of electrical power required by such machine during its cycle period.

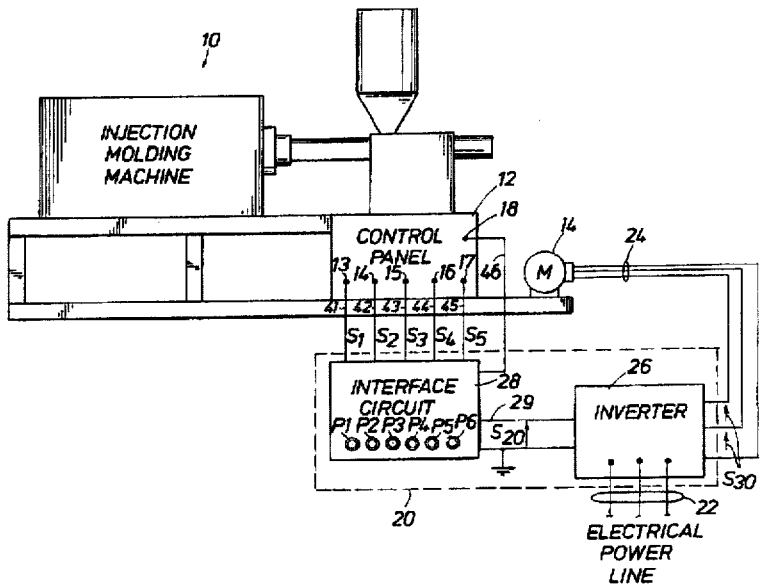

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 are confirmed.

* * * * *